United States Patent [19]

Alexander et al.

[11] 4,341,929
[45] Jul. 27, 1982

[54] MEMORY ACCESSING SYSTEM

[75] Inventors: Richard D. Alexander, Santa Ana; John L. Christofferson, Vista; William H. Ward, Jr., Santa Ana, all of Calif.

[73] Assignee: Zelex, Inc., Santa Ana, Calif.

[21] Appl. No.: 132,338

[22] Filed: Mar. 20, 1980

[51] Int. Cl.³ .......................................... H04M 1/274
[52] U.S. Cl. ........................... 179/90 B; 179/90 BD; 179/18 B; 364/900
[58] Field of Search .............. 179/90 B, 90 BD, 18 B, 179/27 FF, 90 AN; 364/200, 900

[56] References Cited

U.S. PATENT DOCUMENTS

| Re. 26,919 | 6/1970 | Hagelbarger et al. | 364/900 |
|---|---|---|---|
| 3,227,999 | 1/1966 | Hagelbarger | 340/146.1 |
| 3,242,470 | 3/1966 | Hagelbarger et al. | 364/900 |
| 3,260,999 | 7/1966 | Grammer | 364/900 |
| 3,357,113 | 12/1967 | Hagelbarger | 35/13 |
| 3,435,423 | 3/1969 | Fuller et al. | 364/900 |
| 3,568,156 | 3/1971 | Thompson | 364/200 |
| 3,568,159 | 3/1971 | Igakitshi | 364/900 |
| 3,909,796 | 9/1975 | Kitamura | 364/200 |
| 3,932,709 | 1/1976 | Hoff et al. | 179/90 AN |
| 3,964,029 | 6/1976 | Babb | 364/900 |
| 4,104,717 | 8/1978 | Fujimura | 364/200 |
| 4,118,788 | 10/1978 | Roberts | 364/900 |

*Primary Examiner*—Gerald L. Brigance
*Attorney, Agent, or Firm*—Knobbe, Martens, Olson, Hubbard & Bear

[57] ABSTRACT

Data stored in an electronic memory is accessed by search electronics which permit identification and access to a selected memory location in response to a serial search character input. As each search character is input to the system, a search is made through the memory file to determine whether one or more stored data words within the memory include, at any location within the data word, a series of characters in the exact sequence of the previously input search characters. If plural stored data words include the search character sequence, the search character input process is continued until only one storage location within the memory includes the exact character sequence which has been input. The matching data word from memory is then accessed. Because the input search character sequence is compared with memory data words to determine whether an identical sequence exists anywhere within any word, information from the memory file can be accessed without fully specifying the file name and without necessarily specifying the beginning characters of the file name. This permits a substantial increase in both accessing speed and accessing convenience in the system. This file accessing system has been found to be particularly well suited to telephone directory searching and automatic telephone dialing equipment.

21 Claims, 4 Drawing Figures

MEMORY ACCESSING SYSTEM

BACKGROUND OF THE INVENTION

As the cost of electronic digital storage media has steadily declined, the use of such storage media for storing data, such as directories and the like, has rapidly expanded. Typically such memories include a plurality of data listings, each stored with a corresponding data address. Individual data listings are commonly accessed from the data memory by inputting a complete listing of the pertinent address which is then used to access the data portion of the listing from the data file.

While the address portion of such listings is commonly an arbitrary number designation, used for retrieval purposes only, it has been suggested in the past, as in U.S. Pat. No. 26,919, for example, that a portion of the data may, itself, be used to provide access to the stored data. Such accessing is particularly well adapted, for example, to directory use, such as might be provided by a telephone information bureau. In such cases, the memory stores the name of a telephone owner and the appropriate telephone number, the telephone owner's name being utilized as the access element to search the data file. In such systems, alphabetic characters are input at a keyboard and compared with the telephone owners' names, typically stored alphabetically in the directory listing. When a match occurs, a group of telephone numbers is output to a display panel.

Because these systems do not utilize arbitrary addresses to access the stored data locations, as is common with many computer memories, they simply provide a directory of names and numbers where the directory data itself is searched to select a matching group. Such systems, in the past, have typically required that one entire portion of the stored data element be input at the keyboard for comparison. Thus, in a telephone directory system, the prior art would normally require that the full name of the telephone owner be input to the system for comparison with the name field of the memory to determine whether a match exists.

Even in systems of the prior art which did not require input of the entire name field, prior equipment required that the initial characters input at the keyboard match the initial characters in the stored name field. For example, in the telephone directory embodiment of such devices, it is necessary to input the letters in proper sequence of the telephone owner's last name, followed by his first name, exactly as stored in the telephone directory memory file, in order to determine whether a match exists.

Because of these difficulties associated with the prior art, the use of this type of directory searching system has been limited to uses, such as that described in U.S. Pat. No. 26,919, which provide an output, as to a CRT screen, of plural listings from the directory, from which an operator can select a specific directory listing. Thus, in such prior art systems, as keystroke data is entered, it is compared with file listings and, with sufficient keystroke data, a substantial block of data is output for manual searching.

Such systems, therefore, do not permit a unique selection to be made from the memory, do not permit selection of a unique entry based upon characters which may occur anywhere within the desired listing in the memory, and do not permit the connection of such a system to an automatic telephone dialer, since no unique number is selected.

SUMMARY OF THE INVENTION

The present invention alleviates these problems inherent in the prior art by providing a memory searching system which will permit access to a unique memory item in response to input data specifying a portion of the desired unique directory listing, in proper sequential order, anywhere within the listed word.

Furthermore, the present invention provides a search of the stored memory listings after each search character is input to the system, to determine whether sufficient data has been entered to uniquely specify a stored data listing. This permits the user to access a unique data item from the memory by specifying a series of data characters which uniquely match a series anywhere within the stored data listing. At the same time, the system speeds access to the file, since the system provides access to the unique listing as soon as sufficient data has been entered to uniquely identify one data listing from all other listings within the memory.

In the preferred embodiment of this invention, telephone dialing information is stored in an electronic memory, each memory listing including a name field and a telephone number field. The system provides a keyboard, at which a user can enter keyboard data specifying, in sequence, characters within the name field. As the keystroke characters are entered, they are placed sequentially, in order, in a keyboard shift register. After each such character is entered, the sequence of characters in the keyboard shift register is compared with the name field from each of the data listings in the directory. This search is accomplished by shifting the name fields from the memory, sequentially, through a second shift register. As this latter data is shifted from the memory into the second shift register, a comparison is made between a plurality of memory data characters, equal in number to the previously entered data, to determine whether a match exists. Since the entire listing from the electronic memory is shifted, one character at a time, through the second shift register, after each keystroke entry, the system will sense a match of data if the keyboard entered sequence of characters appears anywhere within any of the stored name fields. Thus, for example, if one of the name fields stores the name "Jones, Robert W.", and the operator initially enters the letter "O" on the keyboard, a match will be sensed with this listing, because the letter O exists within the name field.

After each keystroke character entry, the entire name field listing from the electronic memory is circulated to the second shift register to determine whether matches exists. Logic circuits responsive to the comparison testing circuits determine whether 0, 1, or a plurality of the name fields within the electronic memory provide a match. If plural name fields provide a match, the operator is required to enter additional keystroke data. In the example given above, the operator may next enter the letter "B" on the keyboard, so that the letters OB appear in proper order in the keyboard shift register. The entire name field from the memory is again circulated, character by character, through the second shift register. When the listing for "Jones, Robert W." is shifted through the memory register to the right location, a match will be sensed by the system. If, after the entire name field from the memory has been circulated through the second shift register, the system electronics indicate that there is only one match, the data listing for Jones, Robert W. is accessed. This accessing may take the form of outputting the data field listing, that is, the telephone number of "Jones, Robert W.", to an automatic telephone dialing circuit.

The system therefore speeds access to the memory file, since the user is only required to put in a sufficient number of characters to uniquely identify a specific memory listing. In addition, the system is more convenient to use than prior systems, since the operator need not enter the data at the beginning of the name field, but need only enter data which appears in proper sequence anywhere within the name field of the desired listing.

If keystroke data is entered, which provides no matches with memory data, the operator is notified that an error has been made in the entry. That is, that the specified data does not exist anywhere within the file.

The system also provides a solution for a unique problem in such listings, which can be understood through the following example. If two name fields within the listing provide the names "NY", and "SONY", and the first of these listings is desired by the operator, it will be apparent that by entering the keystroke data "NY", the operator will not have uniquely identified this listing, since the comparison electronics will show that two data listings match the keystroke data. The preferred embodiment system permits the operator, after entering the data "NY", to enter keystroke data specifying the fact that this is the entire name field listing for the desired data field. The electronics of the system will then search the name fields within the memory to eliminate those which include additional listing characters, thus providing the listing "NY" as the unique matching listing, so that this selected data may be output.

DESCRIPTION OF THE DRAWINGS

These, and other advantages of the present invention are best understood through reference to the drawings, in which.

DETAILED DESCRIPTION OF THE PREFERRED EMBODIMENT

Figure 1:
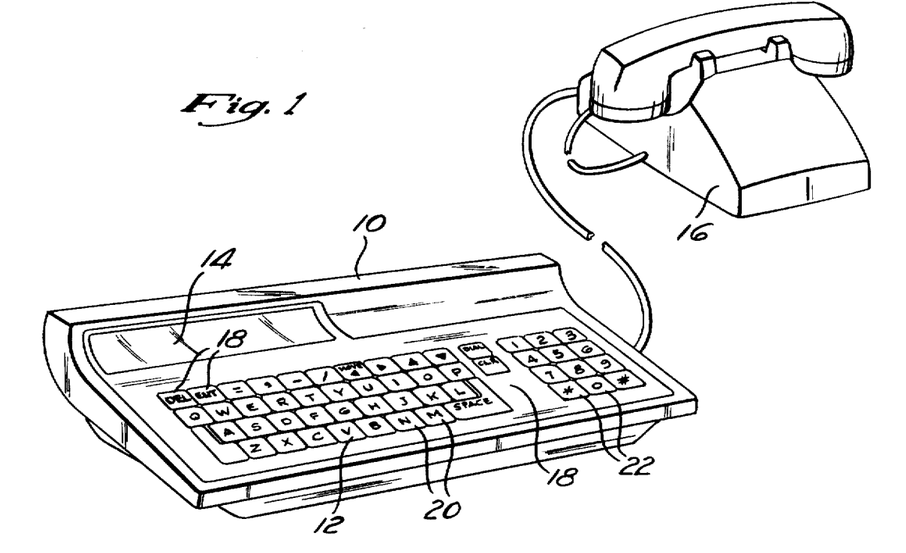
FIG. 1 shows a perspective view of an exemplary telephone dialing system, constructed in accordance with the present invention, and connected to a standard telephone.

Referring initially to FIG. 1, the preferred embodiment of the present invention is incorporated within a telephone dialing system 10 which may be used to store plural telephone numbers and to access these stored numbers in accordance with the invention through the entering of plural keystroke data on a keyboard 12. The system provides an output alpha-numeric display 14 to provide the operator with an indication of the selected listing and permits automatic dialing of the telephone 16 in accordance with the selected listing. The keyboard 12 includes plural control keys 18, alpha-input keys 20, and numeric-input keys 22.

Figure 2:
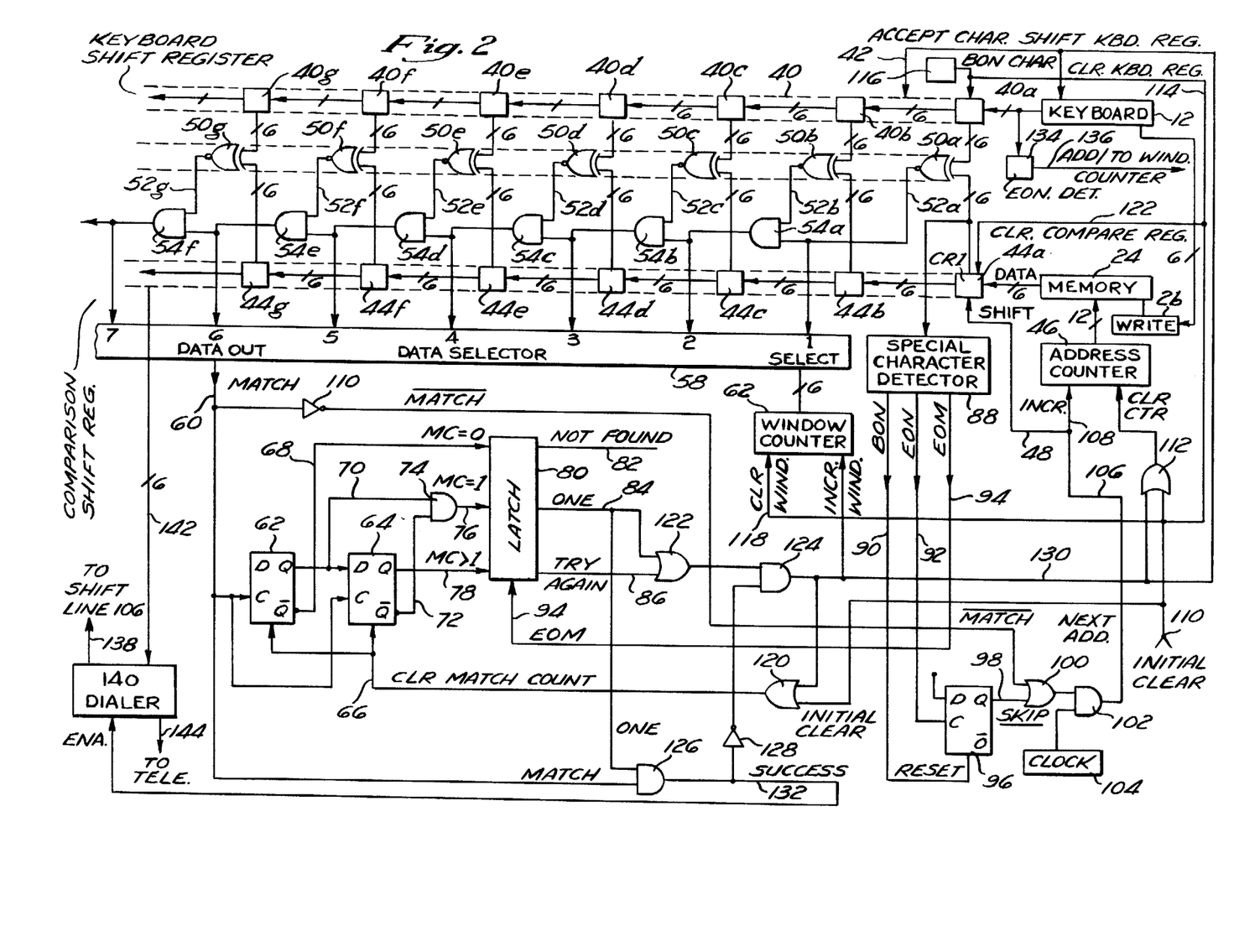
FIG. 2 is a schematic diagram of the memory and search electronics utilized for directory searching in the present invention.

Referring now to FIG. 2, the electronic logic circuits, utilized for implementing the directory search system of FIG. 1, will be described.

The keyboard 12 is connected to an electronic memory 24 by means of a write circuit 26. The write circuit 26 is a standard prior art computer element and is utilized to permit the operator, by entering keystroke data at the keyboard 12, to place names and telephone numbers or other directory listing data in the memory 12. In the exemplary embodiment, memory 24 is 4k×6 binary bits in size.

Figure 3:
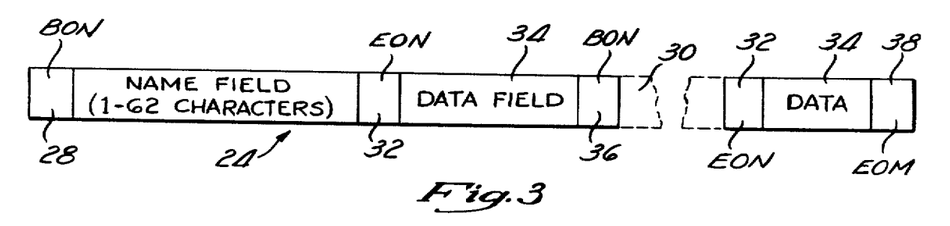
FIG. 3 shows a representative memory field within the memory of FIG. 2.

The write circuit 26 enters data from the keyboard 12 into the memory 24 in accordance with the data field of FIG. 3. Each data field, as would be provided by the keyboard 12 and write circuit 26 for each directory listing, includes a Beginning-Of-Name character 28, identifying the beginning of a data field. This character is followed sequentially by a name field 30, which may include from 1 to 62 alpha characters. In order to provide maximum utilization of the memory 24, the data field 30 is of variable length, depending upon the name of the telephone owner entered at the keyboard 12. The name field 30 is followed by an End-Of-Name character 32, to separate the name field from a data field 34, the latter providing the telephone number of the telephone owner, specified in the field 30. The data field 34 is followed by an additional Beginning-Of-Name character 36, and an additional name field 30, such fields following sequentially within the memory 24 to include all of the listings within the memory. At the end of the listed data, and, specifically, following the final data field 34, an End-Of-Memory character 38 is provided. This End-Of-Memory character 38 is placed at the end of the entered data listings, regardless of the portion of the memory 24 which has been filled. It will be understood, therefore, that the write circuit 26 will move the End-Of-Memory character 38 whenever additional data fields are entered on the keyboard 12.

The circuit of FIG. 2 is utilized to shift the data fields, as shown in FIG. 3, sequentially from the memory 24 for comparison with input keystroke data, in order to access the name field 30 and data field 34, which matches entered keystroke data.

In addition to the connection to the write circuit 26, the keyboard 12 is connected to a shift register 40, only a portion of which is shown. The shift register 40 includes character shift locations 40a, 40b, 40c, etc., to provide, in the preferred embodiment, 64 shift locations. Each shift location 40a through 40f, etc., provides 6 binary shift register locations, as required to store a single alpha-numeric character. Thus, the shift register 40 is 6 binary bits wide, and 64 bits long.

Data within the shift register 40 is shifted one location to the left on receipt of each pulse signal from a line 42, labeled "accept character, shift keyboard register". Thus, when shifted by a pulse on line 42, the character previously stored in character shift location 40a will be shifted to character shift location 40b; that previously stored in location 40b will be shifted to location 40c; etc.

A similar shift register 44, 6 binary bits wide and 64 bits long, to provide shifting storage for 64 alpha-numeric characters, is connected to the memory 24. The memory 24 is addressed utilizing an address counter 46 providing a 12-bit address signal to the memory. The address counter 46 is therefore utilized to shift individual data characters, and thus entire data fields, in sequence, from the memory 24 into the shift register 44, beginning at a first character shift location 44a and, successively, to locations 44b, 44c, 44d, etc. Data is shifted one increment to the left, from character shift location to character shift location, within the shift register 44, each time a pulse appears on a shift line 48.

A comparator 50 is connected to the shift register 40 and the shift register 44. This comparator includes plural exclusive NOR gates 50a, 50b, 50c, etc., each connected by six lines to a character shift location in register 40 and likewise in register 44. Thus, the exclusive NOR gate 50a is connected to the character shift locations 40a and 44a, the exclusive NOR gate 50b to locations 40b and 44b, etc.

The output of the exclusive NOR gate 50a is low, unless the character stored within the character shift location 40a is identical to the character stored within the character shift location 44a. If these characters are identical, the output of the exclusive NOR gate 50a goes high, producing a high signal on a line 52a. Likewise, the output signals on lines 52b, 52c, etc., from exclusive NOR gates 50b, 50c, etc., will be high if the characters stored in the corresponding pair of character shift locations 40b, 44b; 40c, 44c; etc., are identical.

Each exclusive NOR gate 50 provides one input to a series-cascade-connected set of AND gates 54a, 54b, 54c, etc. Because the inputs to the AND gate 54a are provided by the output of exclusive NOR gates 50a and 50b, the output of the AND gate 54a on line 56a will be high only if both exclusive NOR gates 50a and 50b provide high output signals, that is, only if the character stored in character shift location 40a is identical to the character stored in location 44a, and the character stored in location 40b is identical to the character stored in location 44b. The output line 56a is connected as one input to the AND gate 54b, the other input being provided by the exclusive NOR gate 50c. Thus, the output line 56b will be high only if the characters stored in locations 40a, 40b, and 40c are identical to the characters stored in locations 44a, 44b, and 44c, respectively.

Thus, each of the AND gates 54a, b, c, etc., will provide a high output signal on the lines 56a, 56b, 56c, etc., only if the pairs of characters stored in all of the preceding character locations in the registers 40 and 44 are identical. In other words, the output of the exclusive NOR gate 50a on line 52a is high if the first characters in the registers 40 and 44 are identical. The output of the first AND gate on line 56a will be high only if the first two characters in these registers 40, 44 are identical. Similarly, the output on line 56b will be high only if the first three characters in the registers 40 and 44 are identical. The sequence continues, there being provided a total of 64 register locations in the register 40, 64 register locations in the register 44, 64 exclusive NOR gates 50a, and 63 AND gates 54 to complete the comparison circuitry.

The outputs of each of the AND gates 54, as well as the first exclusive NOR gate 50a, are connected to a data selector 58, which includes 64 input lines labeled sequentially 1, 2, 3, etc. This data selector 58 selects one of the input lines 52a, 56a, 56b, etc., for connection to an output line 60, in accordance with an address supplied by a window counter 62. The data selector 58 is thus a multiplexer which selects one channel from the 64 input channels in accordance with the output count of the counter 62, and connects this selected input channel to the output line 60.

From the description which has been provided thus far, it will be seen that, if the window counter 62 outputs the number 1, the data selector 58 will connect the line 52a to the line 60, so that the line 60 will be high if, and only if, the contents of the first character shift locations 40a and 44a are identical. If the window counter outputs the number 2, the signal on line 60 will be high if the first two characters match (40b, 40a; 44b, 44a). Likewise, the window counter outputs the number 64, the first 64 character locations must match in order to provide a high signal on line 60. From this description, it can be seen that, with keyboard data placed in the shift register 40 and memory data placed in the shift register 44, the window counter 62 will determine, by its output count, the number of characters provided by these two sources which will be compared to provide the output signal from line 60. This will be referred to as the comparison window, the window length always equalling the output count from the window counter 62.

The output line 60 is connected to a pair of flip-flops 62,64 connected as a 2-bit binary counter. After this counter has been cleared by a signal on line 66, the output signal on a line 68 from the flip-flop 62 will be high, indicating a count of zero. After a first pulse, or high output signal has appeared on the line 60, the flip-flop 62 will be set, providing a high signal on line 70, and resetting the flip-flop 64. This reset condition of the flip-flop 64 provides a high signal on a line 72 which combines with the signal on line 70 in an AND gate 74 to provide a high signal on a line 76 indicating a count of one. The next successive signal on the line 60 will reset the flip-flop 62 and set the flip-flop 64 to provide a high signal on a line 78, indicating that two pulses have appeared on line 60.

It will become apparent as the description proceeds that the number of pulses present on the line 60, after a clear signal on line 66, is indicative of the number of data fields in the memory 24 which match the characters which have been input at the keyboard 12. Thus, a signal from the line 68 indicates that none of the data fields in memory matches that keystroke data. A latch 80 is set by a signal on a line 94 after the entire memory 24 has been searched, and thus provides, at that time, a sustained output signal on a line 82 labeled "not found" which provides an "error" message on the display 14 (FIG. 1). A signal on the line 76 will be latched in the latch 80, in response to a signal on line 94, to provide a sustained output signal on a latch output line 84 indicating that, on completion of the search, one and only one data field in the memory 24 matches the keystroke data thus far input at the keyboard 12. Similarly, a sustained output signal from the latch 80 on a line 86 at the completion of the search indicates that more than one data field in the memory 24 matches the previously entered keystroke data, so that additional keystroke data is needed to uniquely match only one data field in the memory 24.

A special character detector 88 is connected to the first character shift location 44a of the shift register 44, in parallel with the input to the exclusive NOR gate 50a. This special character detector 88 compares each character placed in the character shift location 44a to determine whether it is a Beginning-Of-Name character 28, an End-Of-Name character 32, or an End-Of-Memory character 38 (FIG. 3). This detector 88 provides a high output signal on one of three lines, 90, 92, or 94, if the character at location 44a matches one of these special characters.

The Beginning-Of-Name output line 90 is connected to reset a flip-flop 96, while the End-Of-Name output line 92 from the detector 88 is connected to set the flip-flop 96. This flip-flop 96 is utilized to skip over data in the memory 24 which is not utilized for search purposes, specifically the data field 34. Thus, referring briefly to FIG. 3 and FIG. 2, in combination, the flip-flop 96 is set as soon as an End-Of-Name character 32 is shifted out of the memory 24, and is reset after a data field 34 has been shifted out of the memory 24 and a Beginning-Of-Name character has appeared at the character shift location 44a. This procedure, as will be seen through the description below, permits the comparison routine of the present system to skip over the data field 34, by shifting this data from the memory and ignoring it for comparison purposes.

Returning again to FIG. 2, when the flip-flop 96 is set, a skip signal is provided on output line 98.

This skip signal on line 98 is supplied by an OR gate 100 to one input of an AND gate 102, the other input being provided by a clock 104, which provides periodic output pulses. So long as the line 98 is high, periodic pulse outputs will appear on output line 106 of the AND gate 102 to simultaneously provide pulse signals to the increment input 108 of the address counter 46 and to the shift input line 48 of the register 44. The clock pulses 104 thus shift data from the memory 24 into the shift register 44, and shift the data from character location to character location (44a, b, c, etc.), until a Beginning-Of-Name character signal appears on line 90, resetting the flip-flop 96 and interrupting the series of clock pulses by providing a low signal from the OR gate 100 to one input of the AND gate 102.

Signals from the clock 104 are also permitted to increment the address counter 46 and shift the register 44 whenever the line 60 provides a low output signal, indicating that, for the current name field and character position in the register 44, a match does not exist. This is accomplished by providing an inverter 110 connected to the output line 60 from the data selector 58, the output of the inverter 110 being connected to the remaining input of the OR gate 100. Thus, when a match does not exist between the compared data in the shift registers 40 and 42, as controlled by the window counter 62, the inverter 110 will provide an output signal for a long enough period of time to permit one clock pulse to be applied from the clock 104 through the AND gate 102 to the address counter 46 and shift register 44.

An initial clear signal is provided by the control button 18 on the keyboard 10 (FIG. 1) to provide a signal on a line 110 which clears the logic elements within the system at the beginning of a memory search. Thus, the clear signal 110 is provided through an OR gate 112 to clear the address counter 46. This clear signal 110 is also connected to a clear keyboard line 114 which clears the keyboard register 40, with the exception of the first character shift location 40a. The signal on line 114 additionally enables a Beginning-Of-Name character writer 116, which writes a Beginning-Of-Name character in the first character location 40a of the register 40, while the remaining locations in the shift register 40 are simultaneously cleared.

The initial clear signal on the line 110 also provides an input at 118 to clear the window counter 62 and, through an OR gate 120, a signal to the clear input 66 of the flip-flops 62 and 64. In addition, the clear signal on line 110 is provided at the clear input 122 of the shift register 44 to clear all of the character shift locations within this register.

Thus, when the search process is begun, the window counter 62 has been reset, so that it selects the first input line 52a for connection to the output line 60. A Beginning-Of-Name character, as indicated previously, has been placed in the character shift location 40a by the writing circuit 116 in response to the initial clear signal 110. Because this Beginning-Of-Name character does not match the cleared location 44a, so that the signal on line 60 is low, providing a high output signal from the inverter 110, a clock pulse propagates from the clock 104 to increment the address counter 46 and the shift register 44 to shift the first character of the first memory data field from the memory 24 into the shift register 44 and, specifically, into character shift location 44a. As can be seen from FIG. 3, it is expected that this first character will be a Beginning-Of-Name character 28.

The operator now strikes a key of the keyboard 12 to input the first alphabetic character to be used in the search process. In the example given at the beginning of this description, this first character might be, for example, the letter O. This letter is read from the keyboard and shifted into the first memory position 40a, while the beginning of name character originally placed in the character shift location 40a by the writing circuit 116 is simultaneously shifted to character location 40b. At the same time, the first character following the Beginning-Of-Name character will be shifted into character shift location 44a of the register 44 and the beginning of name character, originally placed in location 44a, will be shifted to location 44b.

The length of word, selected by the window counter 62, at this time is one, the output count from the counter 62 equalling one, so that the Beginning-Of-Name characters are ignored for comparison purposes. Thus, only the characters in locations 44a and 40a are compared.

At this point, a comparison occurs between locations 40a and 44a in the exclusive NOR gate 50a, to provide a high or low signal through the data selector 58 to the line 60. If these characters match exactly, the high signal on line 60 will set the flip-flop 62, incrementing the match counter 62, 64, so that the output is now one.

The next pulse signal from the clock 104 through the gate 102 will shift the next character out of the memory 24 into the shift register 44, shifting the data previously placed in the memory to successive character shift locations. The window counter 62 still requires that only the first locations within the registers 40 and 44 be compared, as data is shifted successively from the memory 24. Data continues to be shifted from the memory 24, and after each shift, the data selector 58 provides an output signal indicating a match or the lack of a match.

As soon as a second match occurs, indicating that a second data field within the memory includes a character which matches the character in character shift location 44a, the match counter 62,64 will provide a two-output count, generating a signal on line 78.

When the end of the memory is reached, as indicated by a signal on line 94, the latch 80 will be set, and will provide a signal on line 86 if more than one memory field matches the keystroke data. When this occurs, the output from the latch 80 on line 84 is low, so that an AND gate 126 will provide a low output signal. This signal, when inverted by an inverter 128, will combine with the signal from line 86 through OR gate 122 to enable an AND gate 124, which in turn provides a high signal on a line 130.

This signal on line 130 will shift the keyboard register 40 and enable the keyboard 12 so that the operator may input an additional keystroke character. Thus, the count of two reached at the latch 80 indicates that more than one word within the memory 24 included the single letter which had been stored in register location 40a, and thus additional keystroke data is required to uniquely locate a data field within the memory.

In accordance with this need, the window counter 62 is incremented by the signal on the line 130, and the address counter 46 is cleared by this same signal so that the search for data fields, including two characters in proper sequence matching the two characters which will now be present in the register 40, may begin.

It will be understood from this description that the memory 24 is completely searched. If during the search, two matching words are located, the window counter 62 is incremented, additional keystroke data is placed in the register 40, and the search of the memory 24 is repeated, beginning at the beginning of that memory 24.

With the window counter 62 incremented and an additional character in the shift register 40, the data in the memory will now be shifted through the shift register 44, character-by-character, to determine how many data fields include a pair of sequential characters matching the pair of characters in the character locations 40a and 40b. Each time that this comparison is made, if the signal on line 60 shows no match, that is, the characters are not identical, this signal will be inverted by the inverter 110 to force the clock 104 to continue circulating data from the memory 24 until a match occurs.

During the shifting process from the memory 24, whenever a data field is reached, the End-Of-Name character will be shifted into the character shift location 44a and will provide an output signal on line 92. This signal will force the clock signals 104 to continuously shift data from the memory 24 until a Beginning-Of-Name character appears at the character shift location 44a to reset the flip-flop 96. This process allows the data fields to be skipped, so that no comparison is made of this data which would otherwise waste circuit operations and time.

If, when the end of the memory 24 is reached, the match counter 62,64 equals zero, this means that there was no match at all, which provides an output signal on line 82 indicating that there is an error by the operator and that the operator should initialize the system and begin again.

If the match counter equals one when the end of the memory has been reached, this is an indication that there is one and only one unique match between the memory data fields 24 and the keyboard data entered into the register 40. The one output line 84 will be latched under these circumstances. In addition, since the search is complete, there will not be a match signal on the line 60, thus the output of the AND gate 126 will be low and the output of the inverter 128 will be high. Additionally, the latched output on line 84 will provide an input to the AND gate 124 which will zero the address counter 46 and require an additional search through the memory.

It will be understood that this additional search is required, since a complete pass through the memory 24 is required to determine that there is one, and only one matching data set within the memory. The second pass, after this unique match is located, is required to locate the memory field within the memory 24, which provides this unique match.

Under these circumstances, the clock 104 continues to shift data from the memory 24, the window counter size remaining the same, and the data in the shift register 40 remaining the same. As soon as the match is again located, the signal on line 60 will combine within the AND gate 126 with the latched one signal on the line 84 to provide a high output signal from this AND gate 126 to a line 132 indicating success of the search procedure.

It may be desirable, in some circumstances, to specify, at the time of data input at the keyboard 12, that an exact and complete match of the stored data is being sought. Thus, in the example previously mentioned, if the names "Sony" and "NY" were stored in the name fields 30 in two locations of the memory 24, and it were desired to locate the name field "NY", the circuit as thus far described would not provide a unique output for that combination.

The system, however, provides means for indicating that an exact match is specified. This is accomplished by inputting the characters "NY" into the keyboard 12, and then inputting an End-Of-Name character at the keyboard 12. It will be recalled that, as described earlier, the Beginning-Of-Name character was placed from the character writer 116 as the first character into the register 40. This character always precedes the window counter by one count, so that, under normal circumstances, it is always just ahead of the window which is being examined.

When an End-Of-Name character is input from the keyboard 12, an End-Of-Name detector 134 provides a signal on a line 136 which increments the window counter 62 by one count. This will force the comparison window to, in effect, "catch up" with the Beginning-Of-Name character in the register 40, so that the search sequence will search for data in the memory 24 which provides a Beginning-Of-Name character, followed by the characters "NY", followed by an End-Of-Name character, or, an exact match of the complete name, as input at the keyboard. Needless to say, the memory data specifying "Sony" will not match this character bounded word, and the system will provide a latched output on the line 84 for the "NY" characters, as required.

In an exemplary embodiment of this circuit, the shift registers 40, 44 may comprise integrated circuit part number 74164, the exclusive NOR gates 50 may comprise part 74136, the flip-flops 62 and 64 may be part numbers 74174, and the latch 80 may be part number 74175. The counters 62 and 46 may comprise part numbers 74163 and the special character detector may be made up of exclusive NOR gates which would comprise part numbers 74136. This part may also be used for the End-Of-Name detector.

The memory may be constructed from part numbers 2114 and the OR gates may be parts 7432, while AND gates may be parts 7408.

When a signal appears on line 132, indicating that a unique matching set of characters has been found, and that these characters are located in the register 44, this signal 132 may be utilized to notify the operator, as by visual display 14 (FIG. 1), that the search is complete. In addition, as shown in FIG. 2, this signal may provide an enable signal to a telephone dialer 140 to permit this dialer to dial the telephone 16 (FIG. 1). Such dialers are well known in the art. In this circuit, the dialer would include an output line 138, permitting the dialer 140 to apply pulse signals to the line 106 to shift the remaining portion of the data field from the memory 124 into the shift register 44 and to shift the data in the shift register 44 simultaneously. A line 142 connects the dialer 140 to the register 44 so that this data, shifting in the register 44, will be accessed by the dialer 140 in sequence. The dialer 140 will then sense an End-Of-Name character 32 and will utilize the data field 34 following this End-Of-Name character 32 to provide an output signal on a line 144 to dial the telephone 16.

While the preferred embodiments of the present invention are described in reference to a telephone dialing system, it should be understood that the memory accessing system may be useful for a wide variety of application. The essential characteristics of the invention are the ability to search a memory after successive characters are entered for search purposes, so that a unique match may be located as soon as sufficient characters are input to identify such a match. In addition, the system provides the advantage of shifting data from the memory, character by character, and thus placing each character sequence within a given memory field in a comparison window so that a unique match may be provided, regardless of the location, of the matching characters within the memory field.

Figure 4:
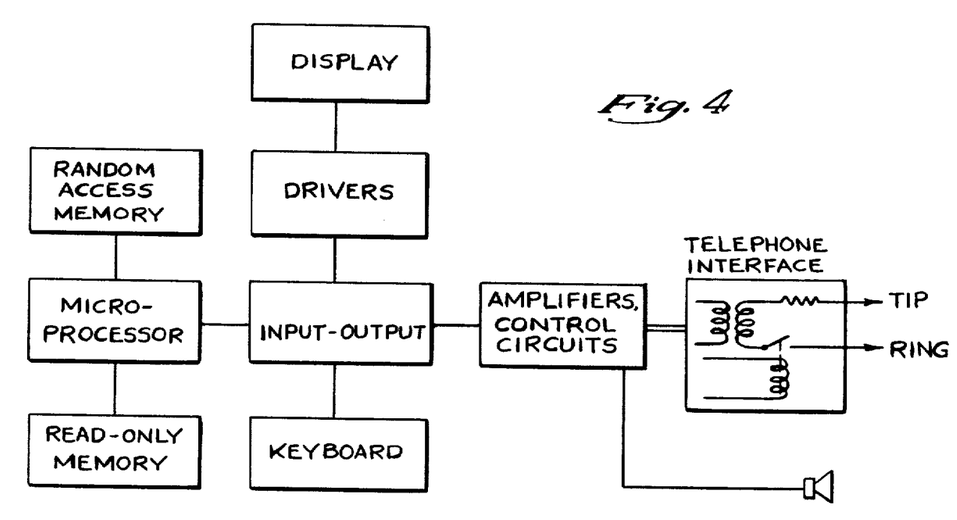
FIG. 4 shows a block diagram of a circuit which may be utilized to implement the present invention utilizing a programmed microcomputer.

While this embodiment provides a hard wired implementation of the invention, this invention may also be implemented utilizing a microcomputer circuit arranged as shown in FIG. 4.

A microprocessor 201, which may be, for example, a Z-80 microprocessor chip, is connected to a Random Access Memory 203, such as a 4816 integrated circuit chip, used to store the memory data of FIG. 3. The operations of the microprocessor 201 are controlled by a program stored in a Read-Only Memory 205, which may be, for example, a 2716 integrated circuit chip. The microprocessor 201 is connected to an input/output controller 207, such as a 2855 chip, which is, in turn, connected to the keyboard 12 (FIG. 1) and plural display drivers 209, such as UDN6118 integrated circuit chips. The drivers 209 are used to drive the display 14 (FIG. 1) which may be, for example, commercially available Part No. FIP16A5R.

The input/output controller 207 additionally connects to the telephone dialer circuit 140, which is, in turn, connected through a standard telephone interface 211 to the tip and ring lines of the telephone circuit. Additionally, a speaker 213 may be used to audibly reproduce the dialing tones for the convenience of the operator.

It will be understood by those skilled in the art that the computer arrangement of FIG. 4 is well known and typical of general purpose application arrangements for microprocessors.

The computer program used in the Read-Only Memory within the microcomputer chip in this implementation is as follows:

```
0000    C3 00 01

0038    C3 C4 0B

0066    C3 B4 01

0100    31 83 21 EB 54 06 04 11 33 0E 21 0F 20 1A AE C2

0110    B4 01 13 23 05 C2 0D 01 00 09 00 00 CB 71 06 AF 0120    32 0B 20 32 0C 20 32 20 20 32 21 20 CB 92 0A 21

0130    27 20 22 16 20 CB 71 06 CB E9 09 FB CB B7 0A FE 0140    66 C2 4A 01 CB B7 03 C3 2F 01 FE 65 C2 55 91 CB 0150    96 04 C3 2F 01 FE 11 DA 70 01 FE 2C D2 70 01 CB

0160    D6 05 3E 01 32 32 21 CD E9 09 CB F2 02 C3 2F 01

0170    FE 01 DA 85 01 FE 0D DA 7F 01 FE 2C C2 85 01 CB 0180    63 02 C3 2F 01 FE 69 C2 90 01 CB BE 02 C3 2F 01

0190    FE 2D CC 98 01 C3 2F 01 CD D6 05 CB 85 0A CB B7

01A0    09 CB B7 0A FE 1A CA B4 01 FE 23 CA 27 02 FE 67

01B0    C2 A1 01 C9 F3 3E 80 DB 03 0A AA 21 FE 3F 70 7E

01C0    A8 CA D2 01 25 7C FE 20 D2 BE 01 3E 80 DA 80 C3

01D0    CF 01 54 5D 3E 55 47 2F 4F 70 7E 73 B6 3C 77 C2
```

| | | | | | | | | | | | | | | | | |
|---|---|---|---|---|---|---|---|---|---|---|---|---|---|---|---|---|
|01E0|EC|01|2B|7C|FE|20|DA|F1|01|C3|B9|01|AF|40|C3|CD|
|01F0|01|EB|22|02|20|21|B5|21|22|00|20|23|A7|20|22|05|
|0200|20|AF|32|1F|20|32|1A|20|32|1B|20|06|04|11|31|0E|
|0210|21|0F|20|1A|77|13|23|05|C2|13|02|23|00|00|2B|7C|
|0220|B5|C2|1E|02|C3|00|01|11|88|0B|0A|10|CD|A8|0A|3A|
|0230|1F|20|B7|C2|38|02|3F|0A|CD|BA|05|CD|F9|09|CD|B7|
|0240|0A|FE|67|CB|FE|01|DA|3F|02|FF|0B|B2|5F|02|32|3F|
|0250|20|F3|CD|4A|06|F1|CD|BA|05|CD|F9|09|21|49|01|CD|
|0260|97|09|C9|F5|21|00|00|22|25|20|21|2F|00|22|27|20|
|0270|21|2B|20|22|23|20|F1|CD|BA|05|FA|FB|03|CD|F9|09|
|0280|CD|B7|0A|FE|01|DA|92|02|FE|20|DA|77|02|FE|25|CA|
|0290|77|02|FE|69|CA|A8|02|FE|A7|CB|FE|3A|C2|80|02|CD|
|02A0|46|06|C3|7D|02|21|6A|20|22|1A|20|F5|11|25|20|06|
|02B0|40|1A|77|13|23|05|F2|B7|02|F1|CD|0D|03|C9|2A|1A|
|02C0|20|7C|B5|CB|CB|B5|0A|22|08|20|CD|E1|09|11|66|20|
|02D0|CD|60|07|CA|DD|02|22|1A|20|CD|F6|02|C9|CD|B7|0A|
|02E0|FE|69|C2|EC|02|21|6A|20|CD|0D|03|C9|FE|67|C2|B0|
|02F0|02|C9|CD|A8|03|B8|CD|B7|0A|FE|67|C6|CD|EA|0A|CD|
|0300|1C|07|FE|69|C2|F6|02|2A|13|20|22|1A|20|AF|32|22|
|0310|20|F3|3A|0C|20|F6|03|32|0C|20|D3|02|FB|CD|B5|06|
|0320|3A|1F|20|FE|0A|C2|29|03|AF|32|1F|20|CD|3D|08|DA|
|0330|58|03|CD|AF|07|DA|58|03|FB|21|9F|99|22|2F|21|2A|
|0340|1A|20|22|08|20|CD|F9|09|CD|B7|0A|FE|67|CA|58|03|
|0350|2A|2F|21|7C|B5|C2|48|03|F3|CD|92|0A|C9|3E|01|32|
|0360|32|21|CD|7D|05|DA|FE|32|CA|87|03|AF|CD|56|04|FA|
|0370|8A|03|C2|5B|03|2A|13|20|22|08|20|CD|B0|09|CD|E1|
|0380|09|C9|3E|01|CD|F6|04|CA|7B|03|CD|BA|06|CB|B7|09|
|0390|21|1A|00|22|08|20|CD|F9|09|CD|B7|0A|FE|67|C2|A3|
|03A0|03|37|C9|FE|33|C2|99|03|CD|46|04|21|25|20|22|08|

| | | | | | | | | | | | | | |
|---|---|---|---|---|---|---|---|---|---|---|---|---|---|
| 03B0 | 20 | CD | E9 | 09 | C3 | 50 | 03 | CD | 85 | 0A | AF | 32 | 32 | 21 | 21 | 56 |
| 03C0 | 03 | 22 | 03 | 20 | CD | E9 | 09 | CD | 7B | 05 | B9 | 3E | 03 | CD | F6 | 04 |
| 03D0 | FA | E2 | 03 | 21 | 29 | 03 | 22 | 03 | 20 | CD | E9 | 09 | CD | 86 | 06 | C3 |
| 03E0 | C7 | 03 | CD | E9 | 09 | CD | B7 | 0A | F5 | F5 | 03 | FF | 01 | BA | 03 | 04 |
| 03F0 | FE | 2F | D2 | 01 | 04 | CD | BA | 05 | F2 | 0E | 04 | 21 | 85 | 0C | C3 | 89 |
| 0400 | 04 | FE | 33 | CA | F5 | 03 | FE | 33 | C2 | 14 | 04 | CD | 46 | 06 | CD | E9 |
| 0410 | 09 | C3 | E5 | 03 | FE | 67 | C8 | FE | 66 | 0A | 21 | 04 | FF | 69 | 02 | F5 |
| 0420 | 03 | 3E | 32 | CD | BA | 05 | CA | E5 | 03 | FA | FB | 03 | 2A | 25 | 20 | 7B |
| 0430 | B4 | C6 | 04 | 6F | 32 | 1C | 20 | AF | A7 | CD | 50 | 07 | CD | 60 | 07 | B2 |
| 0440 | 48 | 04 | 21 | EA | 0C | C3 | 89 | 04 | 7B | 47 | CD | BB | 06 | 2A | 13 | 20 |
| 0450 | 11 | 25 | 20 | 1A | 77 | 13 | 23 | 05 | C2 | 53 | 04 | 21 | 67 | 0B | 22 | 0B |
| 0460 | 20 | CD | E9 | 09 | 2A | 13 | 20 | 22 | 0B | 20 | E5 | 2A | 16 | 20 | EB | E1 |
| 0470 | CD | 60 | 07 | BA | 7D | 04 | 2A | 1C | 20 | 19 | 22 | 1A | 20 | 21 | 48 | 01 |
| 0480 | CD | 97 | 09 | CD | E1 | 09 | C3 | F6 | 02 | 22 | 0B | 20 | CD | E9 | 09 | 21 |
| 0490 | 48 | 01 | CD | 97 | 09 | C9 | CD | 85 | 0A | 21 | F8 | 0C | 22 | 0B | 20 | CD |
| 04A0 | E9 | 09 | CD | 50 | 03 | D8 | CD | B7 | 0A | CD | FA | 06 | CD | 1C | 07 | FE |
| 04B0 | 65 | CA | BA | 04 | FE | 67 | C2 | A6 | 04 | C9 | CD | 85 | 0A | 2A | 13 | 20 |
| 04C0 | 7E | 23 | 86 | C6 | 04 | 2B | 32 | 1C | 20 | CD | 9B | 04 | 2A | 1A | 20 | EB |
| 04D0 | 2A | 13 | 20 | CD | 60 | 07 | DA | F0 | 04 | C2 | E2 | 04 | 21 | 00 | 09 | C3 |
| 04E0 | ED | 04 | 3A | 1C | 20 | 2F | 3C | 83 | 6F | 7A | CE | FF | 67 | 22 | 1A | 20 |
| 04F0 | 21 | 0A | 0B | C3 | 89 | 04 | C5 | 32 | 15 | 20 | 2A | B3 | 0C | EB | 2A | 00 |
| 0500 | 20 | CD | 60 | 07 | EB | D2 | 74 | 05 | 0E | FF | E5 | 23 | 23 | E5 | EB | 2A |
| 0510 | 16 | 20 | EB | 46 | 1A | B7 | CA | 51 | 05 | FE | 11 | DA | 51 | 05 | FE | 2C |
| 0520 | D2 | 51 | 05 | AB | C2 | 2C | 05 | 13 | 23 | C3 | 13 | 05 | 7B | B7 | CA | 4A |
| 0530 | 05 | FE | 2C | D2 | 46 | 05 | 3A | 15 | 20 | B7 | C2 | 41 | 05 | E1 | C3 | 0C |
| 0540 | 05 | 1A | B8 | DA | 72 | 05 | E1 | F1 | CD | 3B | 07 | D2 | 65 | 05 | C3 | 0A |
| 0550 | 05 | EB | 22 | 13 | 20 | D1 | E1 | 22 | 13 | 20 | 3A | 15 | 20 | B7 | C2 | 6B |
| 0560 | 05 | 0C | CA | 48 | 05 | 79 | C1 | B7 | CB | 22 | 13 | 20 | C9 | 7B | C1 | B6 |
| 0570 | 2F | C9 | E1 | E1 | 22 | 13 | 20 | 0E | FF | C3 | 65 | 05 | F1 | CD | B7 | 0A |

| | | | | | | | | | | | | | | | | |
|---|---|---|---|---|---|---|---|---|---|---|---|---|---|---|---|---|
| 0580 | FA | 7D | 05 | 21 | 25 | 20 | 22 | 08 | 20 | F5 | FF | 11 | DA | 7C | 05 | CA |
| 0590 | 9A | 05 | FE | 2C | D2 | B2 | 05 | C3 | A1 | 05 | 3A | 25 | 20 | B7 | CA | 7C |
| 05A0 | 05 | F1 | F5 | CD | D6 | 05 | CD | E9 | 09 | 3A | 32 | 21 | B7 | CA | 7C | 05 |
| 05B0 | F1 | C9 | FE | 33 | C2 | C0 | 05 | CD | 46 | 06 | CD | E9 | 09 | C3 | 7C | 05 |
| 05C0 | FE | 32 | C2 | CE | 05 | CD | DA | 05 | CA | 7C | 05 | C3 | B0 | 05 | FE | 67 |
| 05D0 | C2 | 7C | 05 | F1 | 37 | C9 | E5 | D5 | F5 | 2A | 23 | 20 | EB | 2A | 25 | 20 |
| 05E0 | 7C | B7 | F2 | 1F | 06 | F1 | F5 | FE | 32 | CA | 08 | 06 | 7D | FE | 30 | D2 |
| 05F0 | 3E | 06 | F1 | F5 | 2C | 12 | CD | 85 | 0A | 13 | AF | 12 | F1 | 22 | 25 | 20 |
| 0600 | EB | 22 | 23 | 20 | D1 | E1 | B7 | C9 | 7D | B7 | C2 | 12 | 06 | F1 | AF | C3 |
| 0610 | 04 | 06 | 6F | 67 | 3E | 2F | C3 | F5 | 05 | F1 | 3F | FE | C3 | 04 | 06 | 85 |
| 0620 | FE | 30 | D2 | 19 | 06 | F1 | F5 | FE | 32 | CA | 30 | 06 | 24 | C3 | F5 | 05 |
| 0630 | 7C | B7 | CA | 42 | 06 | 85 | CE | 03 | 2F | 3C | 12 | CD | 65 | 0A | F1 | C3 |
| 0640 | 04 | 06 | D1 | C3 | 04 | 06 | E5 | D5 | 2A | 23 | 20 | EB | 2A | 25 | 20 | 7C |
| 0650 | B7 | F2 | 50 | 06 | 7D | B7 | CA | 6E | 06 | 2B | C3 | 61 | 06 | CA | 6E | 06 |
| 0660 | 25 | 1B | 22 | 25 | 20 | EB | 22 | 23 | 20 | AF | 77 | CD | 85 | 0A | D1 | E1 |
| 0670 | C9 | 21 | 00 | FF | 22 | 25 | 20 | 21 | 27 | 20 | AF | 77 | 22 | 23 | 20 | 21 |
| 0680 | 25 | 20 | 22 | 03 | 20 | C9 | 2A | 25 | 20 | 7C | B7 | FA | 9A | 06 | 26 | FF |
| 0690 | 22 | 25 | 20 | 2A | 23 | 20 | 2B | 22 | 23 | 20 | C9 | F3 | D5 | E5 | D1 | CD |
| 06A0 | 3B | 07 | EB | D2 | B5 | 06 | 1A | 77 | 13 | 23 | F5 | 2A | 00 | 20 | CD | 60 |
| 06B0 | 07 | E1 | DA | A6 | 06 | 22 | 00 | 20 | D1 | FB | C9 | F3 | F5 | 2A | 00 | 20 |
| 06C0 | E5 | D1 | 1B | 05 | 6F | 7C | CE | 00 | 67 | 22 | 00 | 20 | F5 | 2A | D3 | 0C |
| 06D0 | CD | 60 | 07 | E1 | DA | F7 | 06 | 2B | 1A | 77 | 1B | 2B | F5 | 2A | 13 | 20 |
| 06E0 | CD | 60 | 07 | E1 | D2 | D8 | 06 | F1 | FB | C9 | FE | 34 | C0 | F5 | D5 | 2A |
| 06F0 | D3 | 0C | EB | 2A | 13 | 20 | CD | 60 | 07 | DA | 05 | 07 | 2A | 00 | 20 | CB |
| 0700 | 60 | 07 | D2 | 19 | 07 | 2B | 7E | 85 | 6F | 7C | CE | FF | 67 | 22 | 13 | 20 |
| 0710 | 22 | 08 | 20 | CD | E1 | 09 | CD | 85 | 0A | D1 | F1 | C9 | FE | 35 | C0 | F5 |
| 0720 | 2A | 13 | 20 | CD | 3B | 07 | D5 | DA | 0B | 07 | 2A | D3 | 0C | EB | 2A | 00 |
| 0730 | 20 | CD | 60 | 07 | EB | D2 | 19 | 07 | C3 | 0B | 07 | D5 | AF | 57 | 5E | 23 |
| 0740 | 7E | 83 | C6 | 03 | 5F | 19 | FB | 2A | 00 | 20 | CD | 60 | 07 | EB | D1 | C2 |

```
0750   E5 2A 02 20 EB 2A 00 20 7B 95 6F 7A 9C 57 F1 C9
0760   E5 7B 95 6F 7A 9C DA 6B 07 C2 AB 07 B5 E1 C9 F3
0770   3E 10 D3 80 C5 D5 E5 E5 11 00 00 7E CA 02 5F 23
0780   7E 19 E5 D1 85 6F 7C CE 00 67 1A FE 23 CA B3 07
0790   FE 2E CA B3 07 FE 32 DA 9F 07 FE 2C DA C1 07 FE
07A0   01 DA AC 07 FE 0D DC 29 08 DA B3 07 13 CD 60 07
07B0   DA 8A 07 E1 E1 D1 C3 C9 CD 3B 08 DA B3 07 C3 AC
07C0   07 3A 22 20 FE 02 D2 1D 08 3C 32 22 20 E5 C1 F8
07D0   22 16 20 CD F6 04 C2 F0 07 FB 2A 3B 20 F3 CD 6F
07E0   07 DA B3 07 3A 22 20 3D 32 22 20 C5 E1 C3 AC 07
07F0   CD 71 06 2A 16 20 7E FE 11 DA 08 08 FE 2C D2 08
0800   08 CD DA 05 23 C3 F6 07 3E 30 CD DA 05 CA 1A 08
0810   21 35 0B 22 0B 20 CD 92 0A CD E9 09 FB CD B7 0A
0820   FE 67 C2 1D 08 37 C3 B3 07 F5 3A 1E 20 B7 F2 36
0830   08 F1 CD 8D 08 C9 F1 FB CD 58 09 F3 C9 E5 D5 C5
0840   21 78 0D 22 0B 20 CD E9 09 21 35 33 22 2F 21 FB
0850   CD B7 0A FE 69 C2 7A 08 CD 85 0A 3E 02 32 2E 21
0860   3A 2E 21 B7 C2 60 08 3A 1F 20 3D 32 1F 20 2A 13
0870   20 22 0B 20 CD E1 09 C3 88 08 FE 67 CA 87 08 2A
0880   2F 21 7D B4 C2 4F 08 37 F3 C1 D1 E1 C9 C5 D5 E5
0890   FE 01 DA 3E 09 FE 0D D2 3F 09 21 A1 0D 5F 16 00
08A0   1B 19 7E 47 E6 0F 5F 21 99 0D 19 7E CD 46 09 22
08B0   35 21 78 07 07 07 07 E6 0F 5F 21 99 0D 19 7E CD
08C0   46 09 22 39 21 21 D3 01 22 3B 21 23 DF 0B 3E 03
08D0   D3 82 3E 10 D3 80 2B 7C B5 C2 D2 08 22 33 21 22
08E0   37 21 11 39 21 21 37 23 1A 86 77 23 13 1A 8E 77
08F0   B7 1F 21 B1 0D 85 6F 7C CE 00 67 7E 07 1F 1F 4F
0900   07 1F 1F 81 79 11 35 21 21 33 21 1A 8A 77 23 13
0910   1A 8E 77 B7 1F 23 B1 0D 85 6F 7C CE 00 67 7E 83
```

```
0920  CA 80 E6 FC F6 03 D3 82 00 00 3F 02 3F 02 3B C2
0930  2E 09 2A 3B 21 2E 22 3B 21 7C B5 C2 E2 08 3F 83
0940  D3 82 E1 D1 C1 C9 D5 1F 00 B7 1F 57 7B 1F 5F 7A
0950  1F 57 7B 1F 5F EB D1 C9 E5 FE 01 DA 89 09 FE 03
0960  D2 8A 09 B7 21 99 00 CD 97 09 DA 8A 09 CD 8C 09
0970  21 11 00 CD 97 09 DA 8A 09 CD 8C 09 21 0A 09 CD
0980  97 09 DA 8A 09 3D C2 6D 09 B7 E1 C9 F5 3A 0C 20
0990  EE 02 32 0C 20 F1 C9 F5 22 2F 21 CD B7 0A FE 67
09A0  C2 A6 09 F1 37 C9 2A 2F 21 7D B4 C2 A6 09 F1 C9
09B0  E5 21 7C 20 C3 BB 09 E5 21 F3 16 D5 F5 5C 65 F3
09C0  3A 0A 20 E6 BF 57 7A EF 40 57 D3 80 20 C2 CC 09
09D0  6C 1D C2 C6 09 3A 0A 20 EE 0F D3 80 FB F1 D1 E1
09E0  C9 CD E9 09 AF 32 04 20 C9 C5 D5 E5 AF 32 04 20
09F0  06 82 11 A7 20 3E 00 12 13 05 C2 F7 09 11 A7 20
0A00  2A 00 20 46 23 7E 23 3C 80 47 32 07 20 DA 10 0A
0A10  15 06 32 04 20 05 FA 4E 0A 7E 23 3D FA 15 0A FE
0A20  31 D2 15 0A F5 E5 B7 21 31 0C 85 AF 7C CE 00 67
0A30  7E 12 23 13 7E 12 13 E1 F1 FE 30 C2 15 0A 05 FA
0A40  4E 0A 7E 23 FE 31 C2 3E 0A F5 3D C3 25 0A F1 D1
0A50  C1 C9 C5 3A 04 20 47 3A 07 20 90 FF 11 DA 74 0A
0A60  78 3C C3 6E 0A C5 3A 04 20 B7 CA 74 0A 3D 32 04
0A70  20 CD 85 0A C1 C9 F5 FE 36 CC 52 0A F1 F5 FE 37
0A80  CC 65 0A F1 C9 F5 F5 3A 0A 20 F6 40 32 0A 20 EB
0A90  F1 C9 3E 80 D3 83 3A 0C 20 E6 FC D3 82 32 0C 20
0AA0  3E 2F D3 80 32 0A 20 C9 21 25 20 1A 77 13 23 05
0AB0  C2 AB 0A 22 23 20 C9 C5 3A 2B 21 47 3A 0F 20 90
0AC0  FE 10 D2 CA 0A 3E FF C1 B7 C9 78 32 0F 20 CD 45
0AD0  0B FE FF C2 E0 0A AF 32 00 20 32 2E 21 C3 65 0A
0AE0  47 3A 01 20 B3 C2 D3 0A B7 F2 D5 0A 3A 2E 21 B7
```

```
0AF0  C2 C5 0A 7E F6 40 C2 FF 0A 3E 34 C3 2D 0B 3F 2C
0B00  C3 2B 0B B7 CA 03 0B AF 32 0A 20 3E 05 32 2F 21
0B10  3A 2E 21 B7 C2 10 0B CB 45 03 FF FF CA 05 04 B3
0B20  CA 27 0B 47 C3 03 0B B7 F2 33 0B 3E 57 32 2F 21
0B30  7E 32 0B 20 B2 F2 3B 0B E6 3F CB 76 06 FF 67 CD
0B40  B3 0A C1 B7 C9 C5 E5 AF 4F 3C 47 F3 3F 88 D3 83
0B50  7B E6 0F D3 80 DB 81 AF DB 82 67 3F 80 D3 83 3A
0B60  0B 20 D3 81 3A 0C 20 D3 82 3A 0A 20 EF 0F D3 80
0B70  FB 7C B5 C2 85 0B 78 80 47 E6 0F CA 99 0B 79 C6
0B80  10 4F C3 4B 0B CD 9F 0B FA 99 0B 81 21 93 0C 85
0B90  6F 7C CE 00 67 7E C3 9B 0B 3E FF E1 C1 B7 C9 D5
0BA0  AF 57 BC CA AE 0B BD C2 BE 0B 7C C3 B1 0B 16 08
0BB0  7B B7 17 BA BA 0B 14 C3 B1 0B B7 CA C0 0B 16 FF
0BC0  7A D1 B7 C9 F5 E5 D5 3A 0A 20 57 3C EA 0F C2 E5
0BD0  0B 7A EA F0 57 3A 04 20 87 21 A7 20 85 6F 7C CE
0BE0  00 67 C3 E9 0B 14 2A 05 20 7A EE 0F 57 EE 0F F6
0BF0  3F 32 0A 20 7E 5F 32 0B 20 23 3A 0C 20 E6 03 B6
0C00  32 0C 20 D3 82 7B D3 81 7A D3 80 23 22 05 20 21
0C10  2D 21 35 7E 23 E6 03 C2 2C 0C 7E B7 CA 2C 0C 35
0C20  2A 2F 21 7D B4 CA 2C 0C 2B 22 2F 21 D1 F1 F1 FB
0C30  C9 00 C0 DB 00 B1 20 67 00 96 0B BF 00 E9 00 FF
0C40  00 F7 00 FC 24 03 FC 73 C0 00 18 00 18 00 18 00
0C50  18 00 00 EF 00 F1 C0 9C 00 F0 C0 9F 00 8F 00 BD
0C60  00 6F 00 90 C0 78 00 0F 28 1C 00 6C 30 6C 18 FC
0C70  00 CF 00 FC 08 CF 08 B7 00 80 C0 7C 00 6C 18 6C
0C80  0C 00 30 00 70 90 24 03 00 00 24 00 04 13 00 C5
0C90  40 03 C0 2D 2C 2E 32 6A 65 FF FF 03 02 01 69 B5
0CA0  B4 F7 F6 2A 25 23 16 28 22 FF FF 06 05 04 67 21
0CB0  20 1A 26 18 17 15 24 12 FF FF FF 09 08 07 FF 1D
```

```
0CC0   1C 1B 19 27 14 29 2B 33 FF FF FF 0C 0A 0B 31 11
0CD0   1E 1F 13 85 21 0D 00 16 1F 25 23 2A 11 25 20 20
0CE0   11 1D 20 1F 18 00 0F 00 1E 16 1F 20 23 2A 11 20
0CF0   27 16 23 17 1D 20 28 00 0F 00 23 16 12 15 2A 11
0D00   25 20 11 15 16 1D 16 25 16 00 0D 00 16 1F 25 23
0D10   2A 11 15 16 1D 16 25 16 15 00 0C 00 1F 20 11 24
0D20   26 14 19 11 1F 12 1E 16 00 09 00 15 26 21 1D 1A
0D30   14 12 25 16 00 0E 00 1D 16 27 16 1D 11 20 27 16
0D40   23 17 1D 20 28 00 0D 00 16 1F 25 16 23 11 1F 26
0D50   1E 13 16 23 24 00 0E 00 23 16 12 15 2A 11 25 20
0D60   11 16 1F 25 16 23 00 0E 00 16 1F 25 23 2A 11 12
0D70   14 14 16 21 25 16 15 00 0D 00 23 16 12 15 2A 11
0D80   25 20 11 15 1A 12 1D 00 0D 00 23 20 25 12 23 2A
0D90   11 15 1A 12 1D 24 2F 11 00 6B 76 83 91 BA CD E3
0DA0   FB 04 05 06 14 15 16 24 25 26 35 34 36 00 00 00
0DB0   00 00 03 06 09 0C 0F 12 15 18 1B 1F 20 23 26 29
0DC0   2A 2D 2F 31 33 34 36 38 39 3A 3B 3C 3D 3E 3E 3F
0DD0   3F 3F 3F 3F 3E 3E 3D 3C 3B 3A 39 38 36 34 33 31
0DE0   2F 2D 2A 28 26 23 20 1E 1B 18 15 12 0F 0C 09 06
0DF0   03 00 FD FA F7 F4 F0 EE EB E8 E5 E2 E0 DD DA D8
0E00   D6 D3 D1 CF CD CC CA C9 C7 C6 C5 C4 C3 C2 C2 C1
0E10   C1 C1 C1 C1 C2 C2 C3 C4 C5 C6 C7 C8 CA CC CD CF
0E20   D1 D3 D6 D8 DA DD E0 E2 E5 E8 EB EE F1 F4 F7 FA
0E30   FD 9C 3E C7 82
```

It will be seen that the circuit, as described above, permits keystroke data to be entered, character by character, at the keyboard 12. As each character is entered, the entire data file in the memory 24 is searched to determine whether the unique match exists. When a sufficient number of characters have been entered at the keyboard 12, a unique match will provide an output signal which will cause the address counter to circulate the memory 24 to place the uniquely matching data into the shift register 44. The signal on the line 132 may then be utilized to enable an automatic telephone dialing circuit 134. Such circuits exist in the prior art and be made to respond to the memory data within the shift register 44, as shown by the line 136. The dialing circuit 134 will provide signals on output line 138 to shift the register 44, shifting the data into a register within the dialing circuit 134 so that, beginning with the End-Of-Name character 32 (FIG. 3), the data field 34 may be used to provide dialing signals for the telephone 16 (FIG. 1). This portion of the circuit is well known in the prior art and does not incorporate a unique part of the present invention.

What is claimed is:

1. A method of addressing data in an electronic memory, said data including plural words, each including a first plurality of characters in a predetermined order, comprising:

inputting a series of characters, one character at a time, to provide a second plurality of characters, said second plurality increasing by one each time an additional character is input;

investigating said first plurality of characters in each of said plural words, by comparing, after each character of said series of second plurality of characters has been input, said series of second plurality of characters with all subsets of characters in said predetermined order in said first plurality of characters, each of said subsets equal in number of characters to said series of second plurality of characters; and providing an electrical signal output when said series of second plurality of characters input during said investigating step is found to uniquely match only one of said plural words.

2. A method of addressing data, as defined in claim 1, wherein said plural words provide a telephone directory listing, and wherein said first plurality of characters provides the telephone owners' names in said telephone directory listing.

3. A method of addressing data, as defined in claim 2, wherein said plural words additionally comprise a third plurality of characters defining telephone numbers corresponding to said first plurality of characters, said providing step comprising:

outputting a signal indicative of a unique telephone number.

4. A method of addressing data, as defined in claim 1, additionally comprising:

providing an electrical signal output after each of said inputting steps if no unique match is found among said plural words during said investigating step.

5. A method of addressing data, as defined in claim 1, wherein said providing step comprises:

investigating said first plurality of characters in each of said plural words after a unique match has been found to access the particular one of said plural words which yielded said unique match.

6. A method of addressing data, as defined in claim 1, additionally comprising:

inputting a signal indicating that the series of characters previously inputted to said system during said inputting step provides a complete character listing for said first plurality of characters in said plural words in said memory to force a unique match for one of said plural words which is subset of another one of said plural words in said electronic memory.

7. A method of addressing data in an electronic memory, said data including plural words, each including a first plurality of characters in a predetermined order, and of dialing a telephone, comprising:

inputting a series of characters, one character at a time, to provide a second plurality of characters, said second plurality increasing by one each time an additional character is input;

investigating said first plurality of characters in each of said plural words, by comparing, after each character of said series of second plurality of characters has been input, said series of second plurality of characters with all subsets of characters in said predetermined order in said first plurality of characters, each of said subsets equal in number of characters to said series of second plurality of characters;

providing an electrical signal output when said series of second plurality of characters input during said investigating step is found to uniquely match only one of said plural words, said electrical signal output indicative of a unique telephone number;

said plural words providing a telephone directory listing comprising a third plurality of characters defining telephone numbers corresponding to said first plurality of characters, said first plurality of characters providing the telephone owner's names in said telephone directory listing; and automatically dialing a telephone utilizing said unique telephone number.

8. A method of searching for telephone numbers in an electronic memory storing names and telephone numbers, comprising:

inputting, letter-by-letter, a sequence of N letters, selected to match a sequence of letters in one of said stored names;

searching said memory, after the input of each of said letters of said sequence, to determine whether one, and only one, of the names in said memory includes, in at least a portion thereof, an exact sequence of the N letters previously input; and generating, as an output signal, the telephone number from said memory which corresponds to said one name.

9. A method of searching for telephone numbers, as defined in claim 8, wherein said searching step comprises:

counting the number of letters previously input in said inputting step; and selecting subsets of the names in said memory, equal in length to the results of said counting step, for comparison with previously input letters, each of said subsets containing characters in the same sequence as in the name from which the subset was selected.

10. A method of searching for telephone numbers, as defined in claim 8, wherein said searching step comprises:

prohibiting comparison between said sequence of letters and said telephone numbers, so that said searching compares only said sequence of letters and said names in said electronic memory.

11. A method of searching for telephone numbers in an electronic memory storing names and telephone numbers, and of dialing a telephone, comprising:

inputting, letter-by-letter, a sequence of N letters, selected to match a sequence of letters in one of said stored names;

searching said memory, after the input of each of said letters of said sequence, to determine whether one, and only one, of the names in said memory includes, in at least a portion thereof, an exact sequence of the N letters previously input;

generating, as an output signal, the telephone number from said memory which corresponds to said one name; and automatically dialing a telephone with said output signal.

12. A method of searching an electronic memory, comprising:

inputting a search word, character-by-character, to a register, so that a number of characters, N, is in the register at a given time;

inspecting data words in said memory, after each character of said search word is input, by comparing said N characters of said search word with each subset of N normal sequentially ordered characters of each of said data words in said memory; and providing an output signal when said inspecting step locates a unique match between (a) one of said subsets of N normal sequentially ordered characters of said data words in said memory and (b) said N characters of said search word.

13. A method of searching an electronic memory, as defined in claim 12, additionally comprising:

providing a special character at the beginning and end of each data word in said memory; and inputting said special character as any one of said series of N characters of said search word during said inputting step.

14. A method of searching an electronic memory, as defined in claim 12, wherein said data words within said memory comprise telephone numbers and corresponding telephone owners.

15. A method of searching an electronic memory and of dialing a telephone, comprising:

inputting a search word, character-by-character, to a register, so that a number of characters, N, is in the register at a given time;

inspecting data words in said memory, after each character of said search word is input, by comparing said N characters of said search word with each subset of N normal sequentially ordered characters of each of said data words in said memory, said data words within said memory comprising telephone numbers and corresponding telephone owners;

providing an output signal when said inspecting step locates a unique match between (a) one of said subsets of N normal sequentially ordered characters of said data words in said memory and (b) said N characters of said search word; and automatically dialing a telephone in accordance with said output signal.

16. An automatic telephone dialing circuit, comprising:

an electronic memory storing plural names and corresponding telephone numbers;

means for electronically searching said electronic memory to select one of said names corresponding to input search data defining at least a portion of said one of said names; and means for automatically dialing said telephone with the number corresponding to said selected name, said means disabled until said searching means has located a unique one of said plural names corresponding to said input search data.

17. An automatic telephone dialing circuit, as defined in claim 16, wherein said means for electronically searching comprises:

means for storing a sequence of input search characters, smaller in number than the number of characters in said names; and means for comparing the contents of said storing means with names stored in said electronic memory.

18. An automatic telephone dialing circuit, as defined in claim 17, wherein said comparing means compares the contents of said storing means to determine whether said contents appear at any location within said names within said electronic memory.

19. An automatic telephone dialing circuit, comprising:

an electronic memory storing names and corresponding telephone numbers;

means for electronically searching said electronic memory to select one of said names, said searching means comprising:

means for storing search characters, entered character-by-character, for comparison with said names in said electronic memory; and means for comparing the contents of said storing means with said names stored in said electronic memory, after each character is input to said storing means; and means for automatically dialing a telephone with the number corresponding to said selected name.

20. An automatic telephone dialing circuit, comprising:

an electronic memory storing names and corresponding telephone numbers;

means for electronically searching said electronic memory to select one of said names, said searching means comprising:

means for storing characters of a search word, input character-by-character; and means for comparing the names in said electronic memory with the contents of said storing means to identify a unique match between one of said names in said memory and said contents of said storing means, at a time when said storing means contains only a portion of said one of said names in said memory; and means for automatically dialing a telephone with the number corresponding to said selected name.

21. Apparatus for storing and locating data, comprising:

an electronic memory storing data in plural data fields, each field including a search portion and a data portion;

a register for storing inquiry characters;

means for inputting inquiry characters, one at a time, to said register;

means responsive to said inputting means for counting the inquiry characters in said register to provide a count signal;

means responsive to said inputting means, said count signal, and said register, for comparing said inquiry characters in said register with the search portion of each daily field in said memory whenever an inquiry character is input by said inputting means, said comparing means comparing said inquiry characters in said register with all sequential groups of characters in each data field search portion having a length equal to said count signal; and means responsive to said comparing means for providing an output signal when said comparing means locates a unique match for said inquiry characters in said register among said plural data field search portions.

* * * * *

UNITED STATES PATENT AND TRADEMARK OFFICE
CERTIFICATE OF CORRECTION

PATENT NO. : 4,341,929

DATED : July 27, 1982

INVENTOR(S) : Richard D. Alexander, John L. Christofferson, and William H. Ward, Jr.

It is certified that error appears in the above-identified patent and that said Letters Patent are hereby corrected as shown below:

Column 30, line 42, after "means", insert --to select a stored name which corresponds to the contents of said storing means--

Signed and Sealed this

Second Day of November 1982

[SEAL]

Attest:

GERALD J. MOSSINGHOFF

Attesting Officer     Commissioner of Patents and Trademarks